US011381737B2

(12) United States Patent
Nakao

(10) Patent No.: US 11,381,737 B2
(45) Date of Patent: Jul. 5, 2022

(54) ARITHMETIC DEVICE AND ARITHMETIC METHOD

(71) Applicant: SONY CORPORATION, Tokyo (JP)

(72) Inventor: Daisuke Nakao, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/982,582

(22) PCT Filed: Mar. 19, 2019

(86) PCT No.: PCT/JP2019/011394
§ 371 (c)(1),
(2) Date: Sep. 20, 2020

(87) PCT Pub. No.: WO2019/188573
PCT Pub. Date: Oct. 3, 2019

(65) Prior Publication Data
US 2021/0021757 A1   Jan. 21, 2021

(30) Foreign Application Priority Data

Mar. 28, 2018  (JP) .............................. JP2018-063208

(51) Int. Cl.
*H04N 5/232* (2006.01)
*G06T 5/50* (2006.01)
*G06T 7/00* (2017.01)

(52) U.S. Cl.
CPC ........... *H04N 5/23222* (2013.01); *G06T 5/50* (2013.01); *G06T 7/0002* (2013.01); *G06T 2207/20224* (2013.01)

(58) Field of Classification Search
CPC .......... H04N 5/23222; H04N 5/23225; H04N 5/247; H04N 5/23245; G06T 5/50;
(Continued)

(56) References Cited

U.S. PATENT DOCUMENTS 5,835,627 A  *  11/1998  Higgins .................. G06T 5/002
                                                             382/167
10,057,499 B1 *  8/2018  Chen ................... H04N 5/2353
(Continued)

FOREIGN PATENT DOCUMENTS

JP    2000-350239 A    12/2000
JP    2016-046610 A     4/2016
WO    2017/110192 A1    6/2017

OTHER PUBLICATIONS

International Search Report and Written Opinion of PCT Application No. PCT/JP2019/011394, dated Jun. 18, 2019, 08 pages of ISRWO.

*Primary Examiner* — Xuemei G Chen
(74) *Attorney, Agent, or Firm* — Chip Law Group

(57) ABSTRACT

An image quality of a captured image captured by a camera is adjusted to be close to a predetermined image quality. A first image quality evaluation value is obtained on the basis of developed image data obtained by performing development processing on captured image data. An image quality parameter group in the development processing is obtained to decrease a difference between the first image quality evaluation value and a second image quality evaluation value serving as a reference. Alternatively, a plurality of first image quality evaluation values is obtained on the basis of a plurality of pieces of developed image data obtained by performing development processing on each of a plurality of pieces of captured image data. An image quality parameter group in the development processing is obtained to decrease a difference between each of the plurality of first image quality evaluation values and a second image quality evaluation value.

12 Claims, 14 Drawing Sheets

(58) Field of Classification Search
CPC ......... G06T 7/0002; G06T 2207/20224; G06T 2207/30168; G06T 5/002
See application file for complete search history.

(56) References Cited

U.S. PATENT DOCUMENTS

| | | | |
|---|---|---|---|
| 2002/0080143 A1* | 6/2002 | Morgan | G06T 17/00 345/581 |
| 2006/0070257 A1* | 4/2006 | Weissman | G06T 5/002 34/225 |
| 2009/0232377 A1* | 9/2009 | Miao | G06T 11/006 382/131 |
| 2013/0108163 A1* | 5/2013 | Fujii | G06T 7/0002 382/192 |
| 2017/0221186 A1* | 8/2017 | Glotzbach | G06T 5/50 |
| 2017/0272621 A1* | 9/2017 | Park | H04N 5/247 |
| 2017/0295359 A1* | 10/2017 | Cabral | H04N 13/156 |
| 2018/0288297 A1 | 10/2018 | Ikeda et al. | |
| 2019/0028634 A1* | 1/2019 | Koehler | H04N 5/23219 |
| 2019/0378259 A1* | 12/2019 | Hayashi | G01B 11/022 |

* cited by examiner

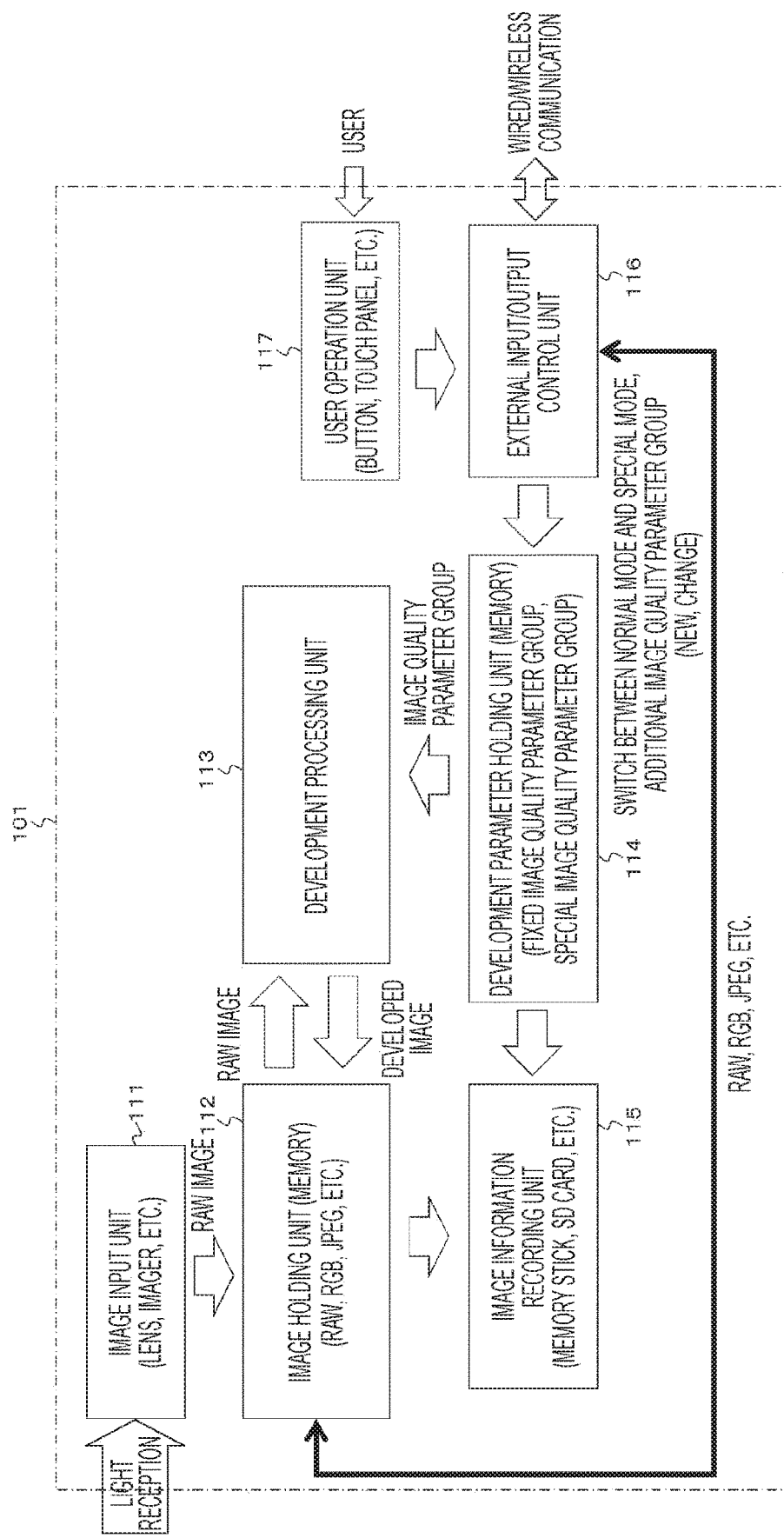

ARITHMETIC DEVICE AND ARITHMETIC METHOD

CROSS REFERENCE TO RELATED APPLICATIONS

This application is a U.S. National Phase of International Patent Application No. PCT/JP2019/011394 filed on Mar. 19, 2019, which claims priority benefit of Japanese Patent Application No. JP 2018-063208 filed in the Japan Patent Office on Mar. 28, 2018. Each of the above-referenced applications is hereby incorporated herein by reference in its entirety.

TECHNICAL FIELD

The present technology relates to an arithmetic device, an arithmetic method, and a program, and more particularly, to an arithmetic device and the like for adjusting an image quality of a captured image captured by a camera to a predetermined image quality.

BACKGROUND ART

There are cases where it is required to adjust an image quality of a captured image captured by a camera to be close to a predetermined image quality, such as an image quality of a captured image captured by a camera of a different model from a camera used for imaging. Regarding adjustment of an image quality of a captured image, for example, Patent Document 1 discloses a camera calibration device that calculates a conversion parameter on the basis of a correspondence relationship of pixels between a captured image of a defined pattern of a geometric shape imaged by a camera and a reference image constituted by the defined pattern.

CITATION LIST

Patent Document

Patent Document 1: Japanese Patent Application Laid-Open No. 2000-350239

SUMMARY OF THE INVENTION

Problems to be Solved by the Invention

It is an object of the present technology to provide an arithmetic device, an arithmetic method, and a program that can acquire an image quality parameter group that adjusts an image quality of a captured image captured by a camera to be close to a predetermined image quality.

Solutions to Problems

A concept of the present technology lies in
an arithmetic device including:
an image quality evaluation value acquisition unit that obtains a first image quality evaluation value on the basis of developed image data obtained by performing development processing on captured image data; and
an image quality parameter group acquisition unit that obtains an image quality parameter group in the development processing to decrease a difference between the first image quality evaluation value and a second image quality evaluation value serving as a reference.

In the present technology, the image quality evaluation value acquisition unit obtains a first image quality evaluation value on the basis of developed image data obtained by performing development processing on captured image data. Then, the image quality parameter group acquisition unit obtains an image quality parameter group in the development processing to decrease a difference between the first image quality evaluation value and a second image quality evaluation value serving as a reference. For example, the second image quality evaluation value may be obtained on the basis of developed image data obtained by performing development processing on captured image data of a second camera of the same model as or a different model from a first camera for obtaining the captured image data.

As described above, in the present technology, an image quality parameter group in development processing is obtained to decrease a difference between a first image quality evaluation value obtained on the basis of developed image data obtained by performing development processing on captured image data and a second image quality evaluation value serving as a reference. It is therefore possible to obtain an image quality parameter group for adjusting an image quality of developed image data obtained by performing development processing on captured image data to be close to an image quality of target developed image data, and adjust an image quality of a captured image captured by a camera to be close to a predetermined image quality. In the present technology, not an evaluation function itself for evaluating the image quality but a difference from a predetermined evaluation value (second image quality evaluation value) is optimized to adjust an image quality to be close to a predetermined image quality.

Furthermore, another concept of the present technology lies in
an arithmetic device including:
an image quality evaluation value acquisition unit that obtains a plurality of first image quality evaluation values on the basis of a plurality of pieces of developed image data obtained by performing development processing on every one of a plurality of pieces of captured image data; and
an image quality parameter group acquisition unit that obtains an image quality parameter group in the development processing to decrease a difference between every one of the plurality of first image quality evaluation values and a second image quality evaluation value obtained on the basis of the plurality of first image quality evaluation values.

In the present technology, the image quality evaluation value acquisition unit obtains a plurality of first image quality evaluation values on the basis of a plurality of pieces of developed image data obtained by performing development processing on every one of a plurality of pieces of captured image data. Then, the image quality parameter group acquisition unit obtains an image quality parameter group in the development processing to decrease a difference between every one of a plurality of first image quality evaluation values and a second image quality evaluation value obtained on the basis of the plurality of first image quality evaluation values. For example, the image quality parameter group acquisition unit may obtain the image quality parameter group under a constraint condition that ensures a certain image quality. Furthermore, for example, the plurality of pieces of captured image data may be captured image data of a plurality of cameras, all of which are the same model, or all or some of which are different models.

As described above, in the present technology, an image quality parameter group in development processing is obtained to decrease a difference between a plurality of first image quality evaluation values obtained on the basis of a plurality of pieces of developed image data obtained by performing development processing on every one of a plurality of pieces of captured image data and a second image quality evaluation value obtained on the basis of the plurality of first image quality evaluation values. It is therefore possible to obtain an image quality parameter group for adjusting image qualities of a plurality of pieces of developed image data obtained by performing development processing on every one of a plurality of pieces of captured image data to be close to each other, and adjust an image quality of a captured image captured by a camera to be close to a predetermined image quality. In the present technology, not an evaluation function itself for evaluating the image quality but a difference from a predetermined evaluation value (second image quality evaluation value) is optimized to adjust an image quality to be close to a predetermined image quality.

Effects of the Invention

According to the present technology, an image quality of a captured image captured by a camera can be adjusted to be close to a predetermined image quality. Note that the effects described here are not necessarily restrictive, and the effects of the invention may be any one of the effects described in the present disclosure.

BRIEF DESCRIPTION OF DRAWINGS

FIG. 3 is a block diagram illustrating a configuration example of a camera.

MODE FOR CARRYING OUT THE INVENTION

Modes for carrying out the invention (hereinafter referred to as "embodiments") will be described below. Note that the description will be made in the order below.

1. First embodiment
2. Second embodiment
3. Business models
4. Modified example

1. First Embodiment

[Camera Image Quality Adjustment System]

Figure 1:
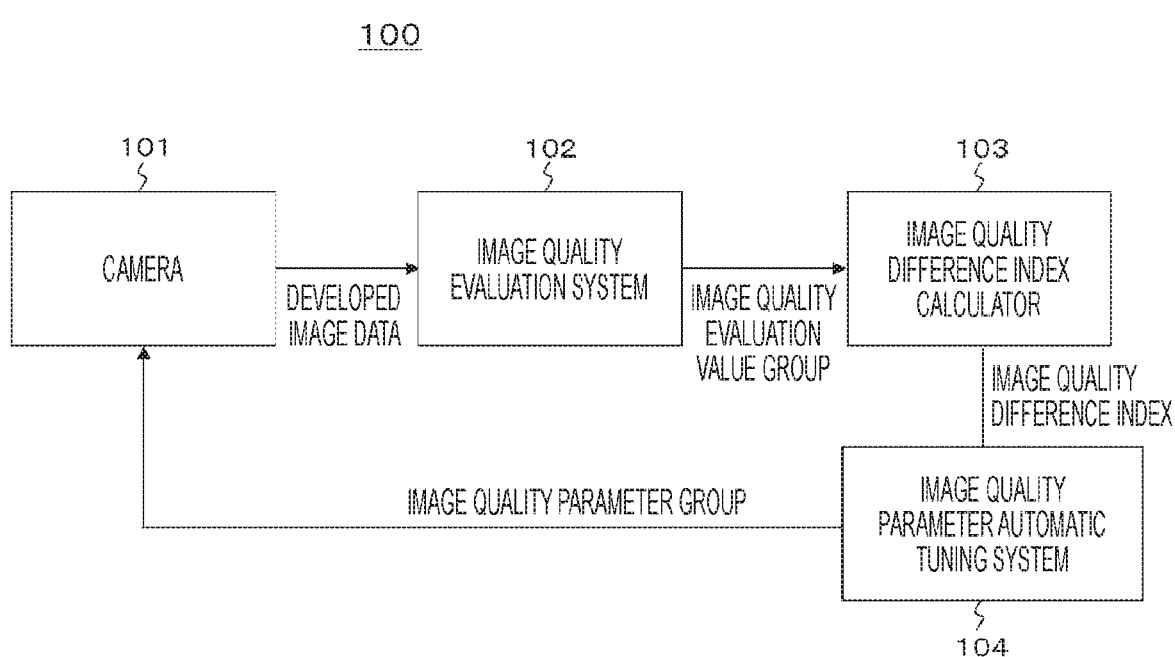
FIG. 1 is a block diagram illustrating a configuration example of a camera image quality adjustment system as a first embodiment.

FIG. 1 illustrates a configuration example of a camera image quality adjustment system 100 as a first embodiment. The camera image quality adjustment system 100 includes a camera 101, an image quality evaluation system 102, an image quality difference index calculator 103, and an image quality parameter automatic tuning system 104. The camera image quality adjustment system 100 is a system for adjusting an image quality of a developed image output from the camera 101 to be close to an image quality of a developed image of a target camera. With this system, an image quality of a captured image captured by a camera can be adjusted to be close to a predetermined image quality. For example, in a case where a plurality of cameras is used to capture images, it may not be possible to create works with a sense of unity because of different image qualities of the corresponding cameras, but such a problem can be solved by the present technology in which image qualities can be adjusted between a plurality of cameras.

Figure 2A:
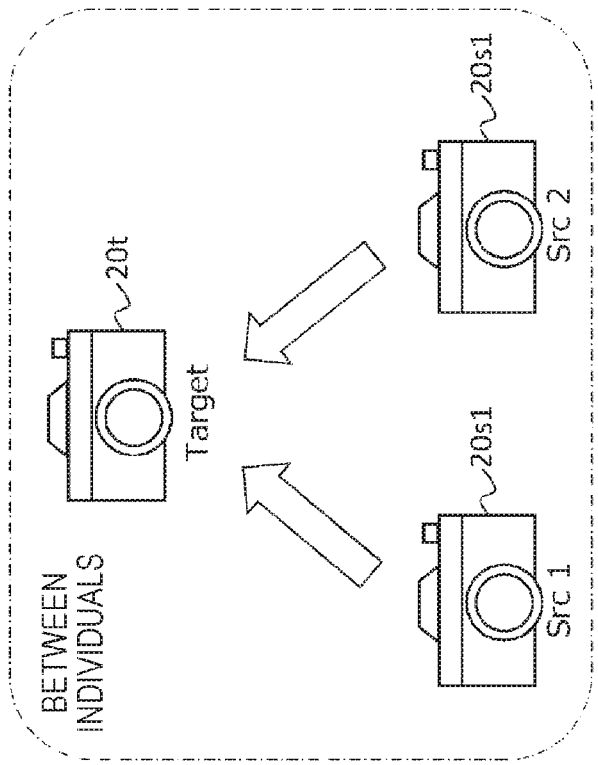
FIGS. 2A and 2B are diagrams illustrating how image qualities are adjusted between models and between individuals.

FIG. 2A illustrates how image qualities are adjusted between models. The illustrated example illustrates source cameras $10s1$ and $10s2$ in addition to a target camera $10t$, in which image qualities of the source cameras $10s1$ and $10s2$ are adjusted to be close to an image quality of the target camera $10t$. Here, the cameras $10t$, $10s1$, and $10s2$ are cameras of different models, and a variation between models and a variation between individuals can be minimized.

Figure 2B:
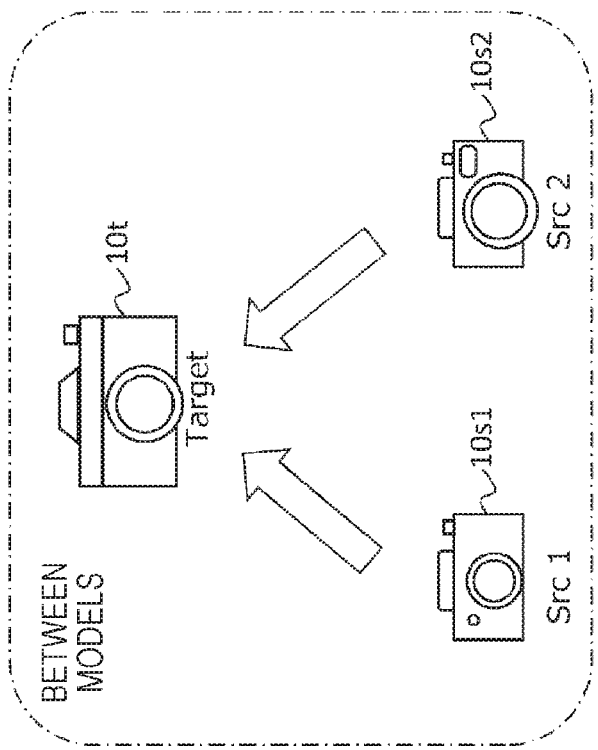

Furthermore, FIG. 2B illustrates how image qualities are adjusted between individuals. The illustrated example illustrates source cameras $20s1$ and $20s2$ in addition to a target camera $20t$, in which image qualities of the source cameras $20s1$ and $20s2$ are adjusted to be close to an image quality of the target camera $20t$. Here, the cameras $20t$, $20s1$, and $20s2$ are cameras of the same model, and a variation between individuals can be minimized. Note that the examples in FIGS. 2A and 2B illustrate a case where the number of source cameras is two, and the same applies to a case where the number of source cameras is three or more.

Returning to FIG. 1, the camera 101 corresponds to a source camera in FIGS. 2A and 2B. FIG. 3 illustrates a configuration example of the camera 101. The camera 101 includes an image input unit 111, an image holding unit (memory) 112, a development processing unit 113, a development parameter holding unit (memory) 114, an image information recording unit 115, an external input/output control unit 116, and a user operation unit 117.

The image input unit 111 includes a lens, an imager, and the like, and the imager outputs raw image data as captured image data. The image holding unit 112 holds the raw image data output from the imager. Here, a chart (Macbeth Color Checker/ISO-12233 resolution test chart, or the like) for evaluating each of color reproducibility, resolution, noise feeling, and the like is imaged by the imager, and raw image data of each of these charts is also held in the image holding unit 112.

The development processing unit 113 performs development processing on the raw image data held in the image holding unit 112, and outputs developed image data. The image holding unit 112 also holds the developed image data output from the development processing unit 113. The development parameter holding unit 114 holds a development image quality parameter group used by the development processing unit 113. Here, in addition to a fixed image quality parameter group used in a normal mode, the development parameter holding unit 114 can hold a special image quality parameter group used for image quality adjustment with another camera in a special mode in this embodiment.

Note that it is expected that there is a plurality of other cameras with which image quality adjustment is to be performed, and the development parameter holding unit 114 can hold not only one but also a plurality of special image quality parameter groups. At this time, each of the special image quality parameter groups is held in association with, by model name, model number, or the like, the other cameras with which image quality adjustment is to be performed.

Figure 4:
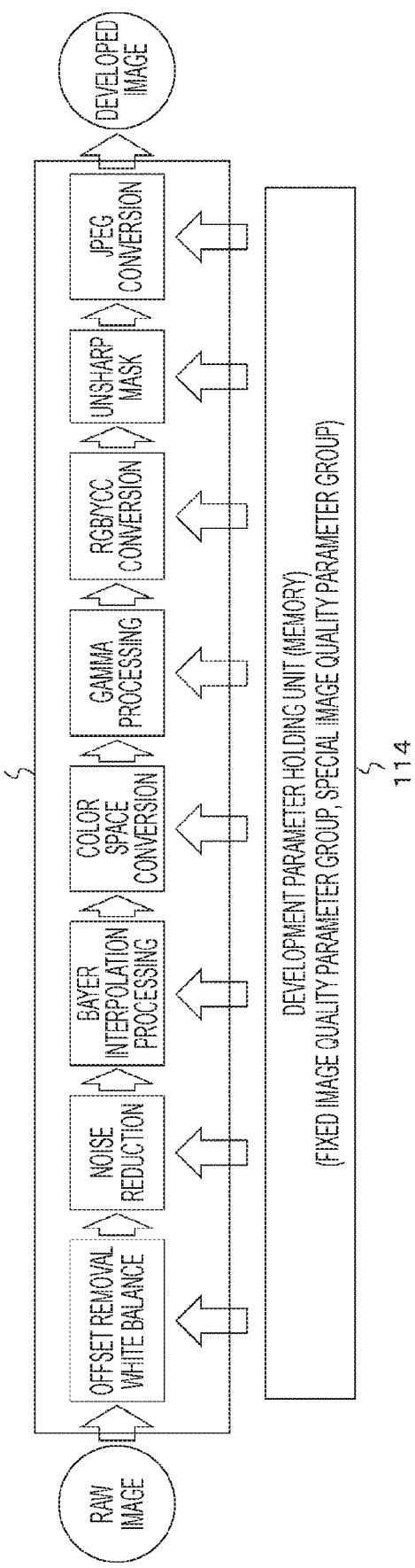
FIG. 4 is a block diagram illustrating a configuration example of a development processing unit.

FIG. 4 illustrates a configuration example of the development processing unit 113. This development processing unit 113 includes an offset removal/white balance unit, a noise reduction unit, a Bayer interpolation processing unit, a color space conversion unit, a gamma processing unit, an RGB/YCC conversion unit, an unsharp mask unit, a JPEG conversion unit, and the like. Note that the illustrated example illustrates only typical processing blocks, and there are many other processing blocks in an actual camera. Furthermore, depending on the camera, some of the processing blocks in the illustrated example may not be used in some cases.

Image quality parameters (development parameters) are used for processing in processing blocks, and affect color reproducibility, resolution, noise feeling, and the like of developed image data, and change an image quality of the developed image data. The image quality parameters exist for most processing blocks, and change intricately depending on characteristics and a mode of a camera. The development parameter holding unit 114 holds all of them, and switches between image quality parameter groups to be passed to the development processing unit 113 in accordance with the mode. The development parameter holding unit 114 can additionally hold a special image quality parameter group obtained through an external input/output device or the like, in addition to a fixed image quality parameter group that is fixedly held.

A plurality of special image quality parameter groups can be held. In automatic tuning processing, an image quality parameter group passed from outside is used to perform development, and a result of the development is sent to an external device for optimization processing. The optimized image quality parameter group is held by the development parameter holding unit 114 as a special image quality parameter group, which is used in a case where a user selects the special mode. Note that a plurality of special modes may be provided.

Returning to FIG. 3, the image information recording unit 115 records raw image data and developed image data held in the image holding unit 112 on a removable medium such as a memory stick or an SD card as needed. Furthermore, the image information recording unit 115 records an image quality parameter group held in the development parameter holding unit 114 on a removable medium such as a memory stick or an SD card as needed.

The external input/output control unit 116 accesses the image holding unit 112, and reads out and transmits the raw image data or the developed image data to external equipment by wired communication or wireless communication. Furthermore, the external input/output control unit 116 receives a special image quality parameter group from external equipment by wired communication or wireless communication, and writes the special image quality parameter group on the development parameter holding unit 114. In this case, a new special image quality parameter group can be written on the development parameter holding unit 114, or can be written over the existing special image quality parameter group to change the special image quality parameter group.

The user operation unit 117 includes a button, a touch panel, and the like, and allows a user to perform a variety of operations. For example, a user can perform an operation to set an operation mode of the development processing unit 113 to the normal mode or the special mode. Furthermore, for example, a user can perform an operation to transmit raw image data or developed image data held in the image holding unit 112 to external equipment. Furthermore, for example, the user can perform an operation to receive from external equipment and write on the development parameter holding unit 114. Moreover, for example, a user can perform an operation to delete a special image quality parameter group held in the development parameter holding unit 114.

Returning to FIG. 1, in the automatic tuning processing for adjusting the image quality of the camera 101, which is a source camera, to an image quality of a target camera, the image quality evaluation system 102 receives a plurality of pieces of developed image data for image quality evaluation from the camera 101. Then, the image quality evaluation system 102 evaluates each of color reproducibility, resolution, noise feeling, and the like on the basis of the plurality of pieces of developed image data to obtain an image quality evaluation value group.

The image quality difference index calculator 103 calculates an image quality difference index that indicates a difference between the image quality evaluation value group obtained by the image quality evaluation system 102 and a reference image quality evaluation value group. Here, an image quality evaluation value group for the target camera is used as the reference image quality evaluation value group. In this case, the image quality evaluation value group for the target camera is acquired by evaluating each of color reproducibility, resolution, noise feeling, and the like on the basis of a plurality of pieces of developed image data for image quality evaluation from the target camera.

The image quality parameter automatic tuning system 104 uses a non-linear optimization algorithm such as genetic algorithms (GA) or simulated annealing (SA) to calculate an image quality parameter group in the development processing unit 113 of the camera 101 on the basis of an image quality difference index calculated by the image quality difference index calculator 103 to decrease the difference. The image quality parameter group calculated by the image quality parameter automatic tuning system 104 is reflected in the development processing unit 113 of the camera 101. The image quality parameter automatic tuning system 104 may use a neural network, deep learning, or the like.

The image quality parameter automatic tuning system 104 repeatedly obtains an image quality parameter group on the basis of a new image quality difference index, optimizes the image quality parameter group, and calculates an optimum image quality parameter group. Finally, the camera 101 holds, in the development parameter holding unit 114, the optimum image quality parameter group calculated by the image quality parameter automatic tuning system 104 as a special image quality parameter group, and uses the special image quality parameter group in the special mode for adjusting the image quality to that of the target camera.

Figure 5:
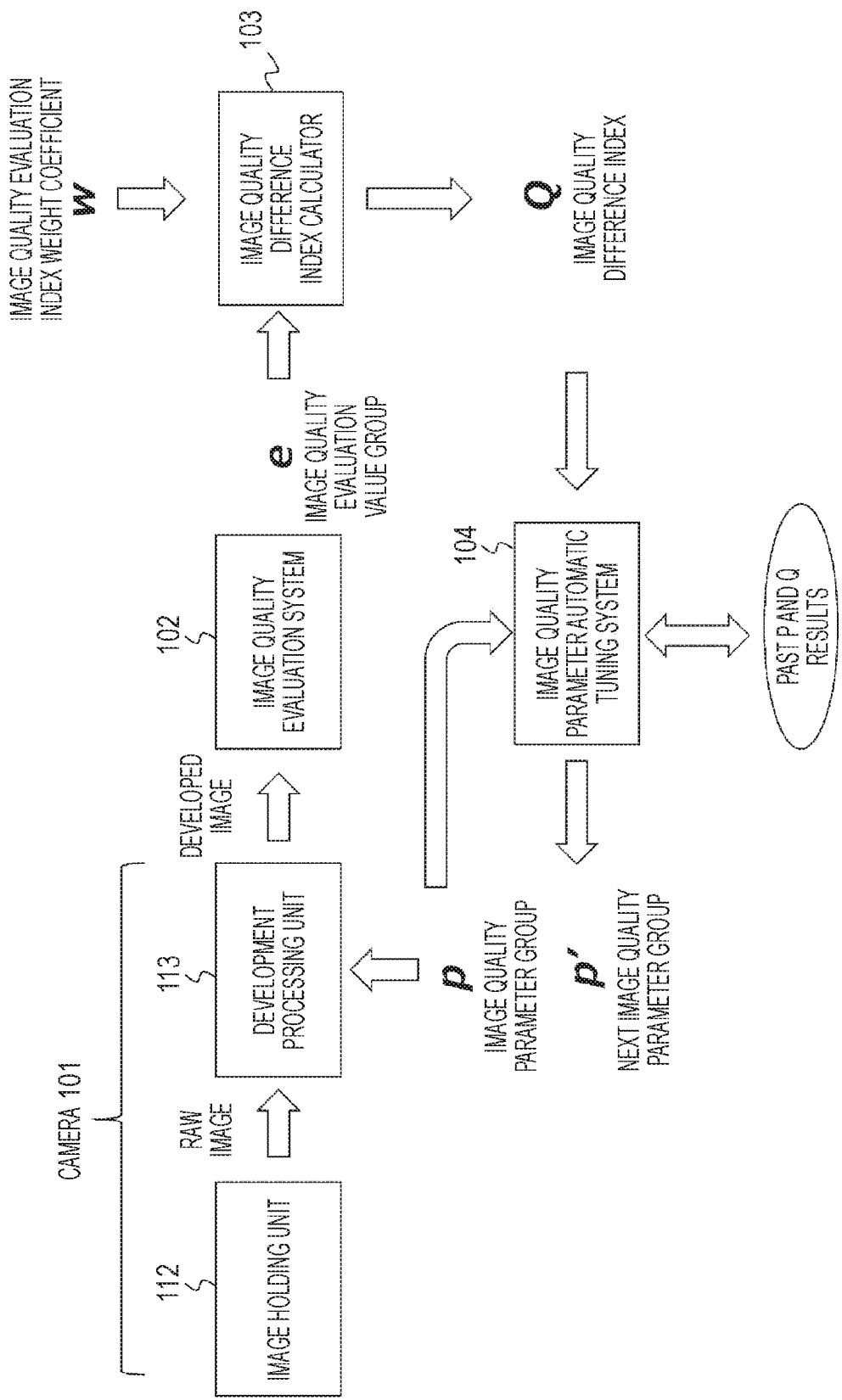
FIG. 5 is a diagram for illustrating optimization processing of an image quality parameter group.

The above-described optimization processing of the image quality parameter group will be further described with reference to FIG. 5. An image quality parameter group P is set in the development processing unit 113, and in that state, development processing is performed on a plurality of pieces of raw image data for image quality evaluation to obtain a plurality of pieces of developed image data for image quality evaluation. Then, on the basis of this plurality of pieces of developed image data, the image quality evaluation system 102 evaluates each of color reproducibility, resolution, noise feeling, and the like to obtain an image quality evaluation value group e.

The image quality evaluation value group e is supplied to the image quality difference index calculator 103. Furthermore, the image quality difference index calculator 103 is also supplied with an image quality evaluation index weight coefficient w. The image quality evaluation index weight coefficient w is a coefficient for weighting each image quality evaluation value in accordance with importance. For example, in a case where the resolution is important and the noise feeling is not important, w for the resolution is increased and w for the noise feeling is decreased. With this arrangement, the difference in image quality can be minimized with a focus on the resolution. Note that, the image quality evaluation index weight coefficient w is used in the example described here, but it is also conceivable that this coefficient is not used in some cases.

The image quality difference index calculator 103 calculates an image quality difference index Q on the basis of, for example, the following Mathematical Formula (1). In this Mathematical Formula (1), "e_src(j)" indicates an image quality evaluation value group of a source camera, that is, elements of the image quality evaluation value group e obtained by the image evaluation system 102, and "e_target (j)" indicates elements of an image quality evaluation value group of a target camera. Furthermore, M indicates the number of elements of the image quality evaluation value group. Note that the mathematical formula for obtaining the image quality difference index Q is not limited to Mathematical Formula (1). For example, it is also conceivable that a sum of difference absolute values is used as the image quality difference index Q.

[Math. 1]

$$Q = \sqrt{\sum_{j=1}^{M} w(j)(e_{target}(j) - e_{src}(j))^2} \quad (1)$$

The image quality difference index Q is supplied to the image quality parameter automatic tuning system 104. Furthermore, the image quality parameter automatic tuning system 104 is also supplied with the image quality parameter group P. The image quality parameter automatic tuning system 104 calculates a next image quality parameter group P' on the basis of P and Q. The image quality parameter automatic tuning system 104 repeats this processing to derive an image quality parameter group P that optimizes the image quality difference index Q. Note that the image quality parameter automatic tuning system 104 may reference past P and Q.

Figure 6:
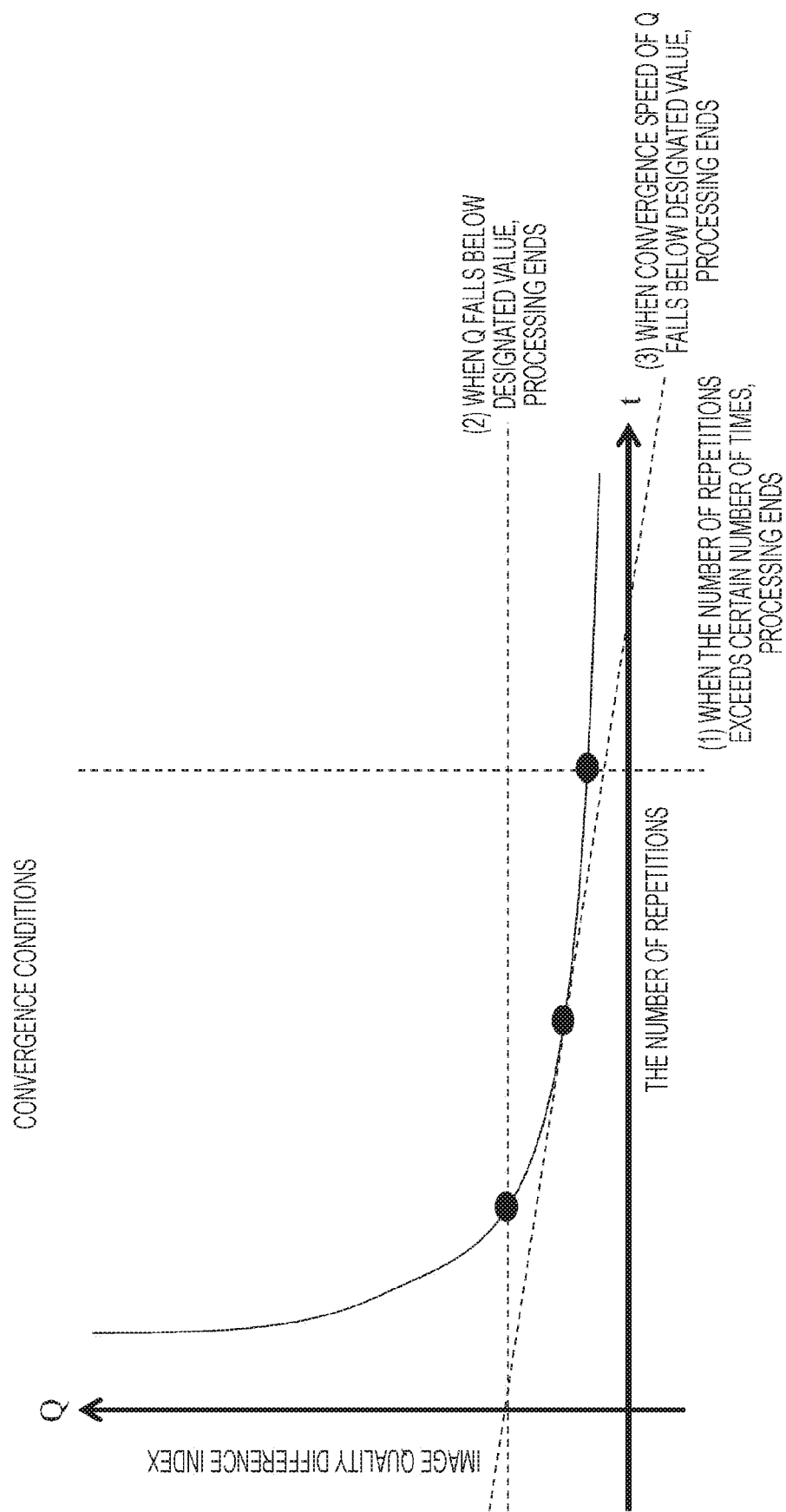
FIG. 6 is a diagram for illustrating convergence conditions in an image quality parameter automatic tuning system.

FIG. 6 illustrates an example of convergence conditions in the image quality parameter automatic tuning system 104. As the convergence conditions, for example, the following (1) to (4) can be considered. (1) When the number of repetitions exceeds a certain number of times, the processing ends. (2) When a convergence speed of the image quality difference index Q falls below a designated value, the processing ends. (3) When the image quality difference index Q falls below a designated value, the processing ends. Furthermore, it is also conceivable that a combination of (1) to (3) is set as (4). For example, in a case where the processing is repeated according to (3), there is a possibility that the processing may not end, so when the number of times designated in (1) is exceeded, the processing is forcibly ended even if (3) is not satisfied. In that case, it is necessary to return, as information, the condition under which the processing has ended.

As described above, in the camera image quality adjustment system 100 illustrated in FIG. 1, the image quality parameter automatic tuning system 104 obtains an image quality parameter group that optimizes the image quality difference index obtained from the image quality evaluation value group of the camera 101 and the image quality evaluation value group of the target camera. It is therefore possible to easily obtain an image quality parameter for adjusting the image quality of the camera 101 as the source camera to be close to the image quality of the target camera.

Note that, the camera image quality adjustment system 100 in FIG. 1 illustrates an example in which the development processing unit 113 included in the camera 101 is used in the automatic tuning processing. Although a detailed description is omitted, the image quality evaluation system itself includes a development processing unit, and it is also conceivable that, in automatic tuning processing, the development processing unit is used to perform development processing and optimize the image quality parameter group. In this case, a plurality of pieces of raw image data for image quality evaluation is supplied from the camera 101 to the image quality evaluation system 102.

Furthermore, in the case of "between models" illustrated in FIG. 2A, in actual operation, it is also possible to perform optimization processing on all (or typical) combinations in advance, and provide the image quality parameter group as it is at the time of provision to a user. However, in the case of this method, although a variation between camera models can be minimized, a variation between individuals is excluded from the optimization.

Furthermore, as described above, in the case of the method of adjusting, to the image quality of the target camera, the image qualities of other source cameras, the optimization may not yield a satisfactory result depending on settings of the target camera in some cases. For example, there is a case where the target camera is the latest model, and its level cannot be reached no matter what image quality parameter group the other source cameras may take. In order to prevent such adverse effects, for example, in a case of image quality adjustment among three cameras, a method can be considered in which, for example, optimization is performed with each of the three cameras set as target cameras, and settings of a target camera with the best result (small Q) among the three cameras are used as a final result.

2. Second Embodiment

[Camera Image Quality Adjustment System]

Figure 7:
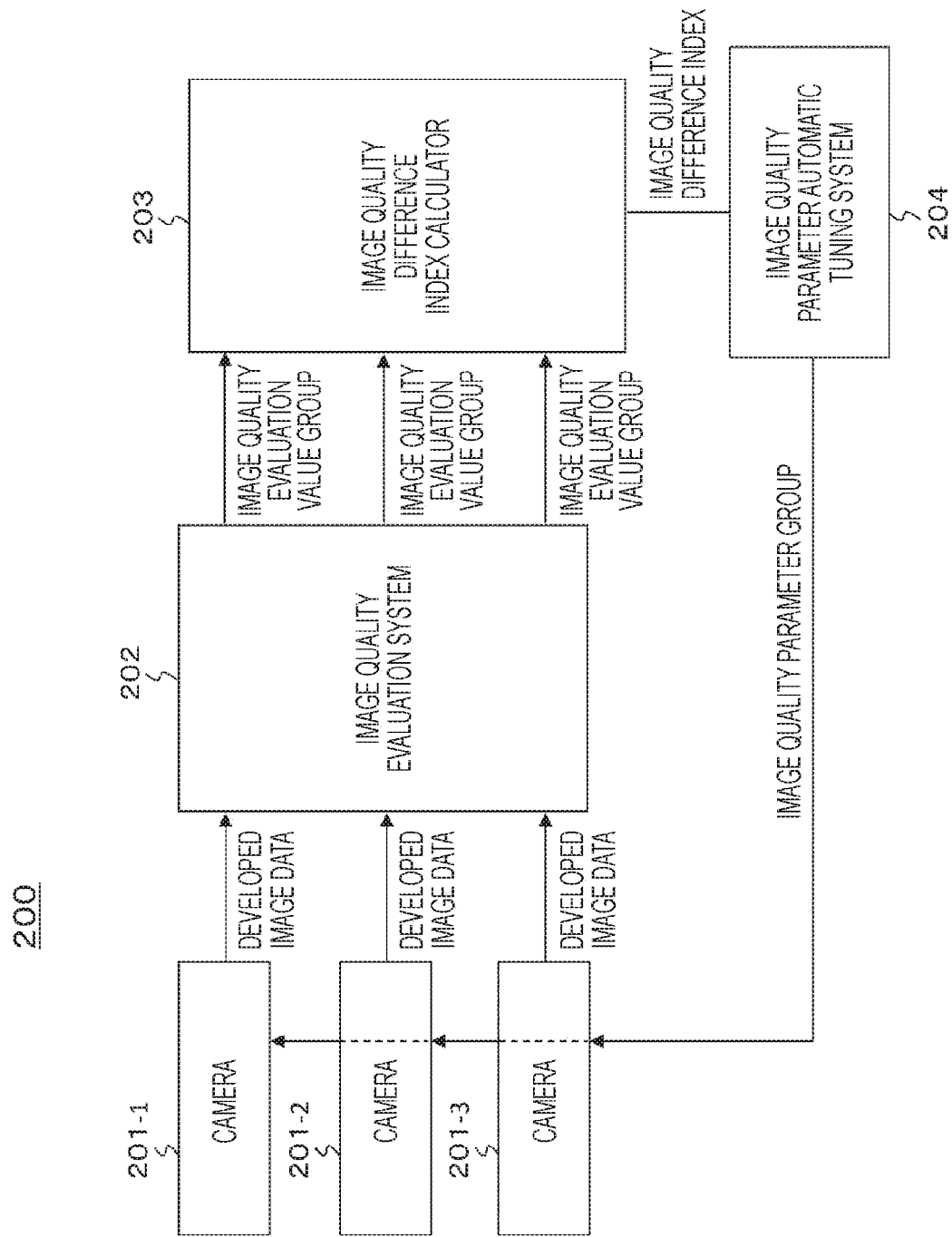
FIG. 7 is a block diagram illustrating a configuration example of a camera image quality adjustment system as a second embodiment.

FIG. 7 illustrates a configuration example of a camera image quality adjustment system 200 as a second embodiment. The camera image quality adjustment system 200 includes cameras 201-1, 201-2, and 201-3, an image quality evaluation system 202, an image quality difference index calculator 203, and an image quality parameter automatic tuning system 204. The camera image quality adjustment system 200 is a system for adjusting image qualities of developed images output from the cameras 201-1, 201-2, and 201-3 to be close to each other. With this system, an image quality of a captured image captured by a camera can be adjusted to be close to a predetermined image quality. For example, in a case where a plurality of cameras is used to capture images, it may not be possible to create works with a sense of unity because of different image qualities of the corresponding cameras, but such a problem can be solved by the present technology in which image qualities can be adjusted between a plurality of cameras.

The camera image quality adjustment system 200 minimizes a difference in image quality as a whole by mutually changing image quality parameter groups without setting a specific target camera. For example, in a case where the target camera is the latest model and its image quality is better than any other cameras, no matter how their image quality parameter groups are changed, the other cameras cannot create the image quality of the target camera. In the camera image quality adjustment system 200, the image qualities of all the cameras "approach each other", and this increases a degree of optimization of the difference in image quality. Unlike the case where a target camera is set, the camera image quality adjustment system 200 does not perform optimization for each camera, but performs optimization of the image quality parameter groups of all the cameras at the same time.

Figure 8A:
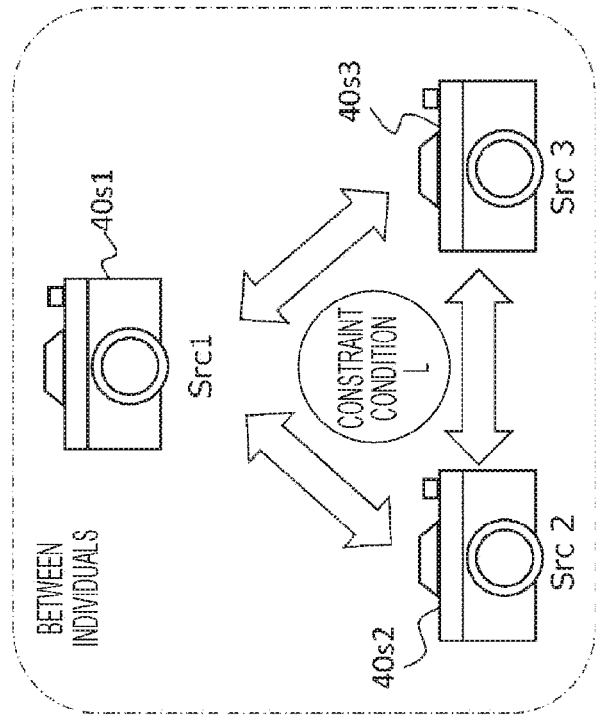
FIGS. 8A and 8B are diagrams illustrating how image qualities are adjusted between models and between individuals.

FIG. 8A illustrates how image qualities are adjusted between models. The illustrated example illustrates source cameras 30s1, 30s2, and 30s3, in which image qualities of these source cameras 30s1, 30s2, and 30s3 are adjusted to be close to each other under a constraint condition L. Here, the source cameras 30s1, 30s2, and 30s3 are cameras of different models, and a variation between models and a variation between individuals can be minimized.

Figure 8B:
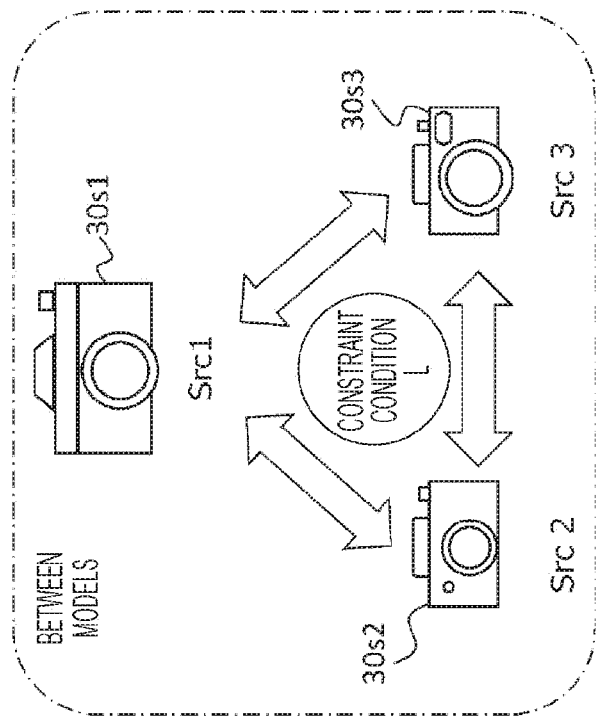

Furthermore, FIG. 8B illustrates how image qualities are adjusted between individuals. The illustrated example illustrates source cameras 40s1, 40s2, and 40s3, in which image qualities of these source cameras 40s1, 40s2, and 40s3 are adjusted to be close to each other under a constraint condition L. Here, the cameras 40s1, 40s2, and 40s3 are cameras of the same model, and a variation between individuals can be minimized. Note that the examples in FIGS. 8A and 8B illustrate a case where the number of source cameras is three, and the same applies to a case where the number of source cameras is four or more.

Returning to FIG. 7, the cameras 201-1, 201-2, and 201-3 correspond to the three source cameras in FIGS. 8A and 8B. Although a detailed description is omitted, each camera has a configuration similar to that of the camera 101 illustrated in FIG. 1 described above (see FIG. 3).

In automatic tuning processing for adjusting the image qualities of the cameras 201-1, 201-2, and 201-3, the image quality evaluation system 202 receives a plurality of pieces of developed image data for image quality evaluation from each of the cameras 201-1, 201-2, and 201-3. Then, the image quality evaluation system 202 evaluates each of color reproducibility, resolution, noise feeling, and the like for each camera on the basis of the plurality of pieces of developed image data for image quality evaluation to obtain an image quality evaluation value group.

The image quality difference index calculator 203 calculates an image quality difference index that indicates a difference between the image quality evaluation value group of each camera obtained by the image quality evaluation system 202 and a reference image quality evaluation value group. Here, the reference image quality evaluation value group is obtained on the basis of the image quality evaluation value group of each camera. For example, an average value of image quality evaluation values of each camera is obtained for each image quality evaluation value and used as the reference image quality evaluation value.

The image quality parameter automatic tuning system 204 uses a non-linear optimization algorithm such as genetic algorithms (GA) or simulated annealing (SA) to calculate an image quality parameter group in the development processing unit 113 in each of the cameras 201-1, 201-2, and 201-3 on the basis of an image quality difference index calculated by the image quality difference index calculator 203 to decrease the difference. The image quality parameter group of each camera obtained by the image quality parameter automatic tuning system 204 is reflected in the development processing unit 113 in each of the cameras 201-1, 201-2, and 201-3.

The image quality parameter automatic tuning system 204 repeatedly obtains an image quality parameter group of each camera on the basis of a new image quality difference index, optimizes the image quality parameter group of each camera, and calculates an optimum image quality parameter group. Finally, the cameras 201-1, 201-2, and 201-3 hold, in the development parameter holding unit 114 of each camera, the optimum image quality parameter group of each camera calculated by the image quality parameter automatic tuning system 204 as a special image quality parameter group, and use the special image quality parameter group in the special mode for image quality adjustment.

Note that the above-described automatic tuning processing for adjusting the image qualities of the cameras 201-1, 201-2, and 201-3 is performed under a constraint condition L that ensures a certain image quality. This is because, without such a constraint condition L, the difference in image quality may become smaller, but there is a possibility that the image quality itself is not guaranteed. For example, in a case of an image quality parameter for "painting the whole image in black", all images are in solid black, so there is no difference in image quality. The image quality difference index therefore becomes 0, which is the best result. However, such a result does not meet users' expectations. A constraint condition L is for ensuring a certain image quality, and, for example, "all image quality evaluation values are equal to or greater than a designated value" can be considered.

Figure 9:
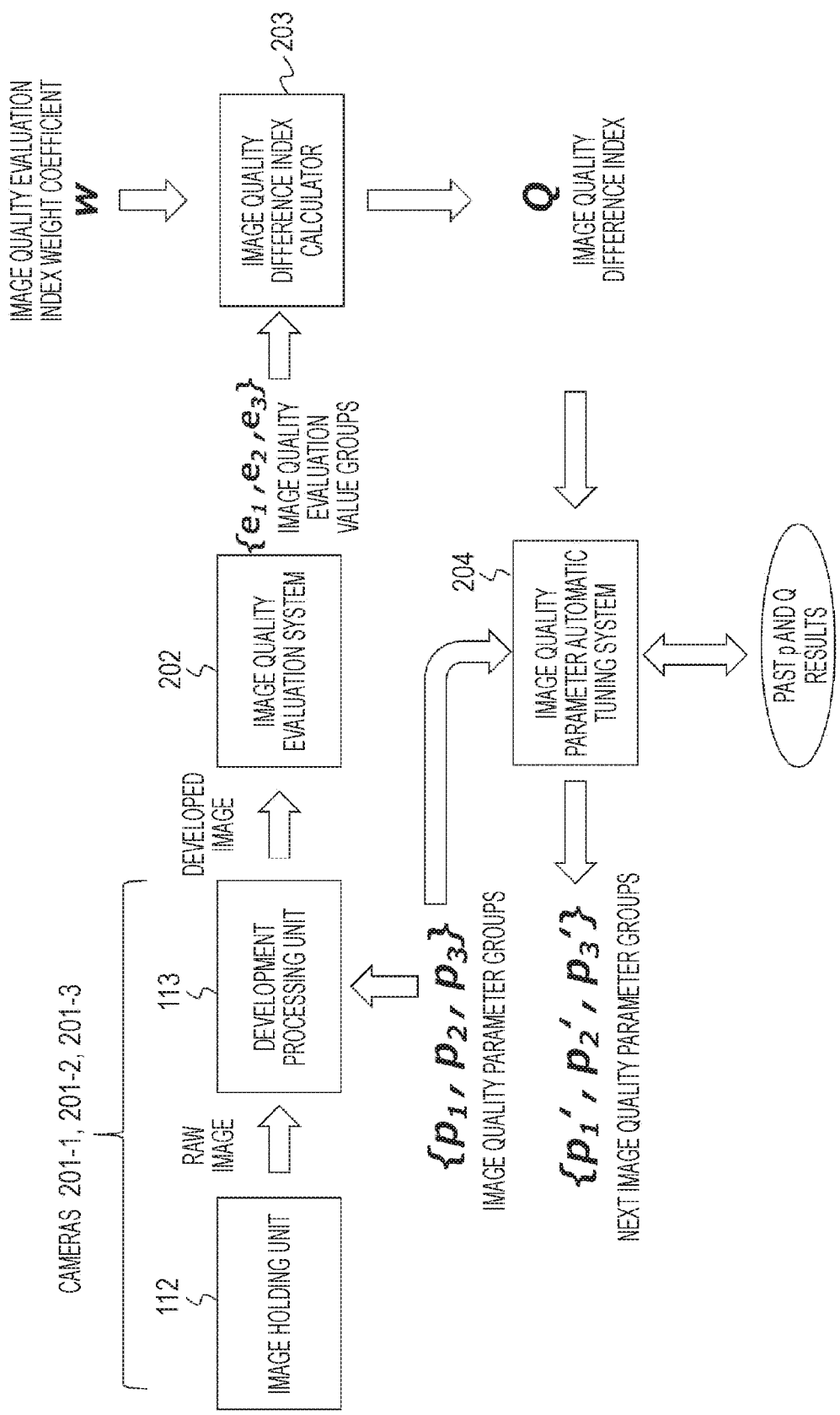
FIG. 9 is a diagram for illustrating optimization processing of an image quality parameter group.

The above-described optimization processing of the image quality parameter group will be further described with reference to FIG. 9. Image quality parameter groups P1, P2, and P3 are set in the development processing units 113 of the corresponding cameras, and in that state, development processing is performed on a plurality of pieces of raw image data for image quality evaluation to obtain a plurality of pieces of developed image data for image quality evaluation. Then, for each camera, on the basis of the plurality of pieces of developed image data for image quality evaluation, the image quality evaluation system 202 evaluates each of color reproducibility, resolution, noise feeling, and the like to obtain image quality evaluation value groups e1, e2, and e3.

These image quality evaluation value groups e1, e2, and e3 are supplied to the image quality difference index calculator 203. Furthermore, the image quality difference index calculator 203 is also supplied with an image quality evaluation index weight coefficient w. The image quality evaluation index weight coefficient w is a coefficient for weighting each image quality evaluation value in accordance with importance. For example, in a case where the resolution is important and the noise feeling is not important, w for the resolution is increased and w for the noise feeling is decreased. With this arrangement, the difference in image quality can be minimized with a focus on the resolution. Note that, the image quality evaluation index weight coefficient w is used in the example described here, but it is also conceivable that this coefficient is not used in some cases.

The image quality difference index calculator 203 calculates an image quality difference index Q on the basis of, for example, the following Mathematical Formula (2). In this Mathematical Formula (2), "e_src(i) (j)" indicates an image quality evaluation value group of a source camera (i), that is, elements of the image quality evaluation value group e of the source camera (i) obtained by the image evaluation system 202, and "e bar (j)" indicates elements of a reference image quality evaluation value group. Furthermore, M indicates the number of elements of the image quality evaluation value group. Furthermore, N indicates the number of cameras, and N=3 here. Note that the mathematical formula for obtaining the image quality difference index Q is not limited to Mathematical Formula (2).

[Math. 2]

$$Q = \frac{1}{N} \sum_{i=1}^{N} RMSE(e_{src(i)}) \quad (2)$$

$$RMSE(e_{src(i)}) = \sqrt{\frac{1}{M} \sum_{j=1}^{M} w(j)\{e_{src(i)}(j) - \overline{e}(j)\}^2}$$

$$\overline{e}(j) = \frac{1}{N} \sum_{i=1}^{N} (e_{src(i)}(j))$$

The image quality difference index Q is supplied to the image quality parameter automatic tuning system 204. Furthermore, the image quality parameter automatic tuning system 204 is also supplied with the image quality parameter groups P1, P2, and P3 of the corresponding cameras. The image quality parameter automatic tuning system 204 calculates next image quality parameter groups P1', P2', and P3' on the basis of P1, P2, P3, and Q. The image quality parameter automatic tuning system 204 repeats this processing to derive image quality parameters P1, P2, and P3 that optimize the image quality difference index Q under a constraint condition L that ensures a certain image quality. Note that the image quality parameter automatic tuning system 204 may reference past P and Q.

Note that, although a detailed description is omitted, convergence conditions in the image quality parameter automatic tuning system 204 are similar to the convergence conditions in the image quality parameter automatic tuning system 104 illustrated in FIG. 1 described above (see FIG. 6).

As described above, in the camera image quality adjustment system 200 illustrated in FIG. 7, the image quality parameter automatic tuning system 204 obtains an image quality parameter group of each camera that optimizes the image quality difference index obtained from the image quality evaluation value groups of the cameras 201-1, 201-2, and 201-3 and the reference image quality evaluation value group obtained on the basis of these image quality evaluation value groups. It is therefore possible to easily obtain an image quality parameter for adjusting the image qualities of the cameras 201-1, 201-2, and 201-3 to be close to each other.

Note that, the camera image quality adjustment system 200 in FIG. 7 illustrates an example in which the development processing units 113 included in the cameras 201-1, 201-2, and 201-3 are used in the automatic tuning processing. Although a detailed description is omitted, the image quality evaluation system itself includes a development processing unit, and it is also conceivable that, in automatic tuning processing, the development processing unit is used to perform development processing and optimize the image quality parameter group. In this case, a plurality of pieces of raw image data for image quality evaluation is supplied from the cameras 201-1, 201-2, and 201-3 to the image quality evaluation system 202.

Furthermore, in the case of "between models" illustrated in FIG. 8A, in actual operation, it is also possible to perform optimization processing on all (or typical) combinations in advance, and provide the image quality parameter group as it is at the time of provision to a user. However, in the case of this method, although a variation between camera models can be minimized, a variation between individuals is excluded from the optimization.

3. Business Models

Next, first to fourth business models using the present technology will be described.

"First Business Model"

Figure 10:
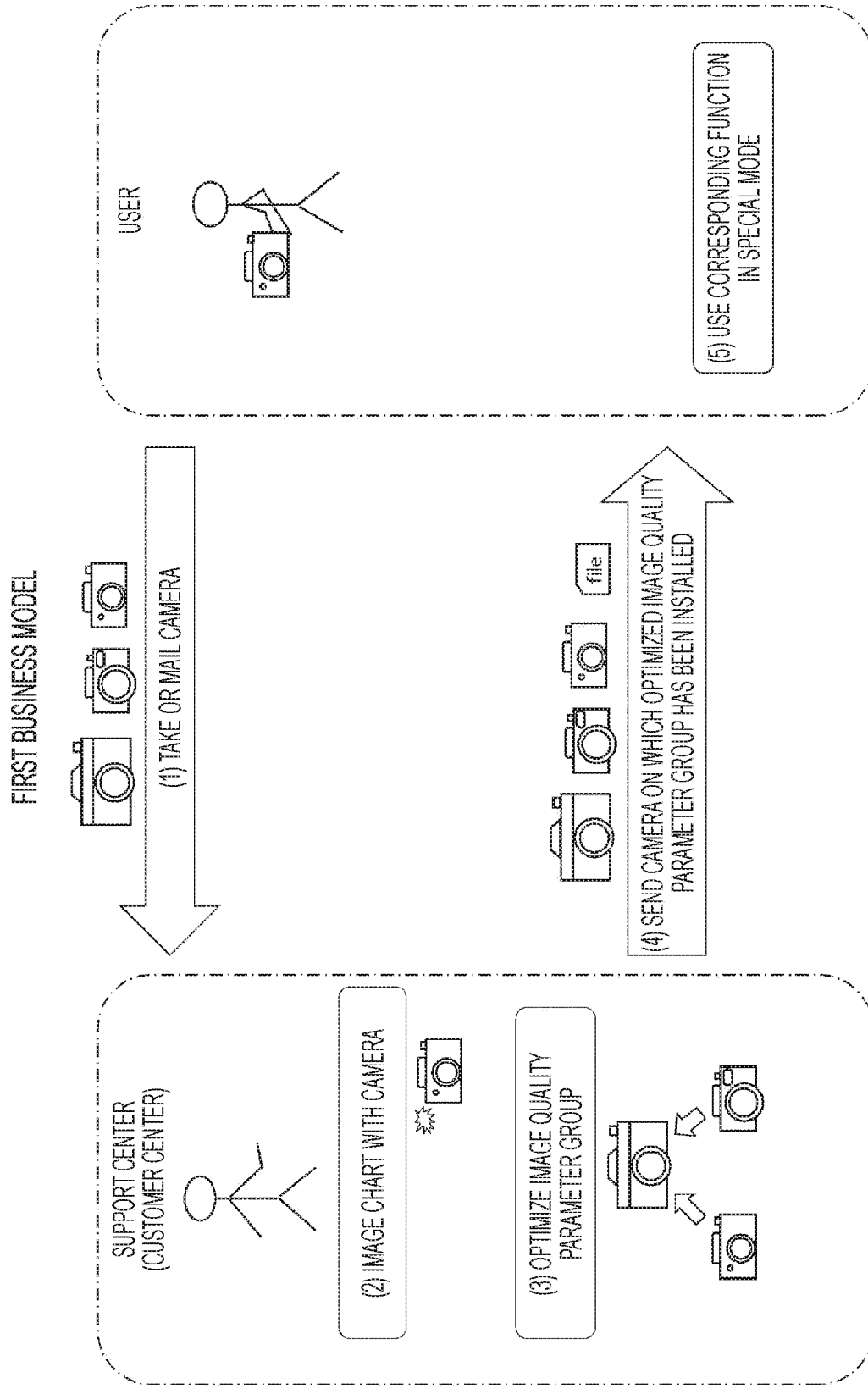
FIG. 10 is a diagram schematically illustrating a first business model using the present technology.

FIG. 10 schematically illustrates the first business model.

(1) A user takes or mails, to a center, a group of cameras on which image quality adjustment is to be performed. In this case, the user does not have to, but can specify which is to be a target camera (Target) and which is to be a source camera (Src).

(2) The center images a chart (Macbeth Color Checker/ISO-12233 resolution test chart, or the like) for evaluating each of color reproducibility, resolution, noise feeling, and the like with each camera to obtain a plurality of pieces of raw image data for image quality adjustment.

(3) The center optimizes an image quality parameter group of each camera on the basis of the plurality of pieces of raw image data for image quality adjustment for each camera.

(4) The center sends, to the user, each camera on which the optimized image quality parameter group has been installed as a special image quality parameter group.

(5) The user can use the special image quality parameter group by switching each camera to a special mode, and can capture images with the image qualities of the corresponding cameras being close to each other.

In this first business model, the center images a chart and performs optimization, and a variation between individuals can also be optimized. Thus, the first business model can be used for both image quality adjustment between models and image quality adjustment between individuals.

"Second Business Model"

Figure 11:
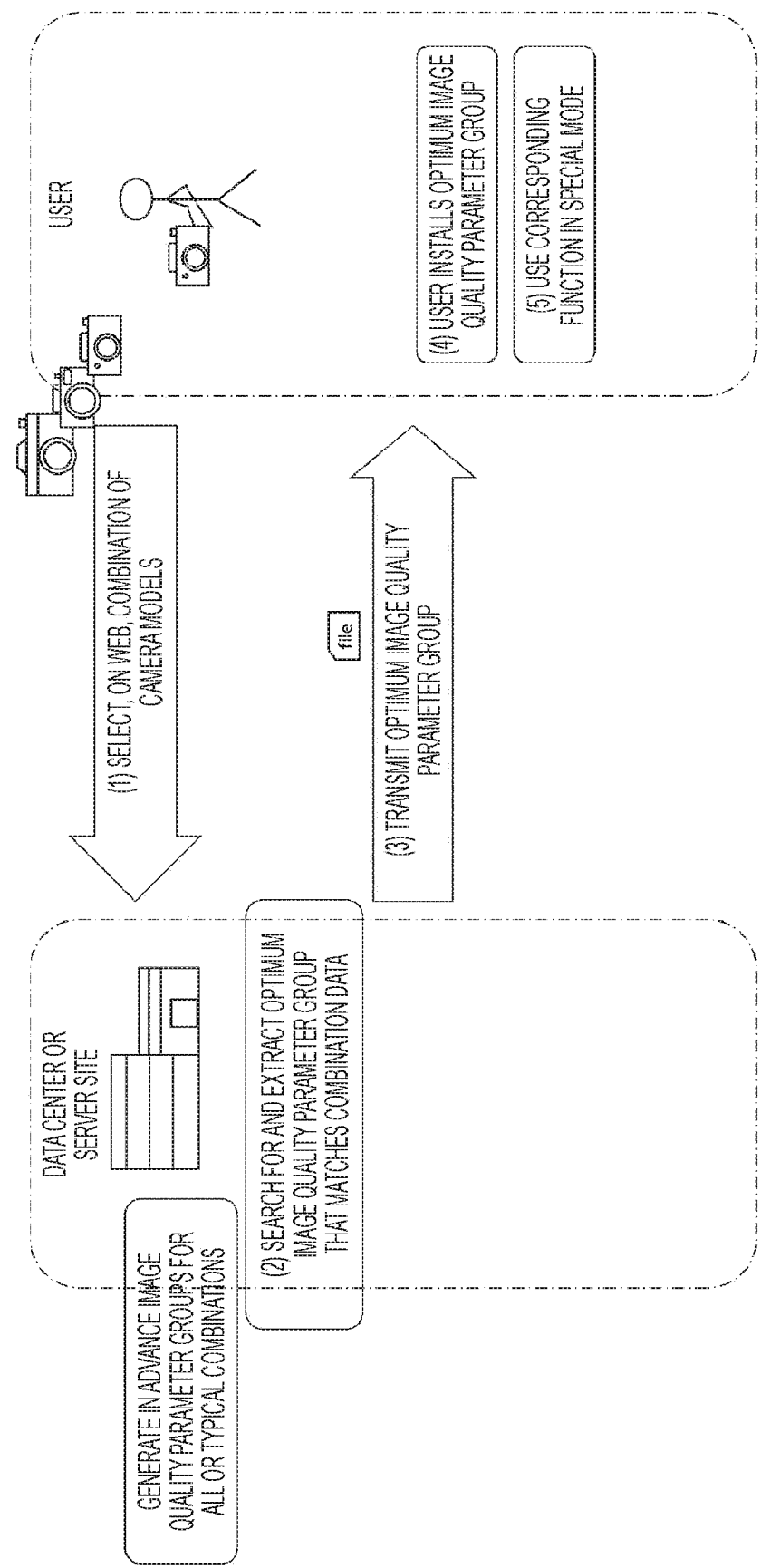
FIG. 11 is a diagram schematically illustrating a second business model using the present technology.

FIG. 11 schematically illustrates the second business model.

(1) A user selects, on the Web, a combination of models of camera groups on which image quality adjustment is to be performed, and transmits data regarding the combination to a data center or a server site. In this case, a combination in which a target camera (Target) and a source camera (Src) are specified may be used.

(2) The data center or the server site may generate and save in advance an optimum image quality parameter group of each camera in all or typical combinations of models. The data center or the server site searches for and extracts the optimum image quality parameter group of each camera that matches the data regarding the combination sent from the user.

(3) The data center or the server site transmits the optimum image quality parameter group of each camera to the user.

(4) The user installs, on each camera, the optimum image quality parameter group of each camera received from the data center or the server site as a special image quality parameter group.

(5) The user can use the special image quality parameter group by switching each camera to a special mode, and can capture images with the image qualities of the corresponding cameras being close to each other.

In this second business model, there is no information regarding the individual cameras of the user, and it is not possible to optimize a variation between individuals. Thus, the second business model can be used only for image quality adjustment between models.

"Third Business Model"

Figure 12:
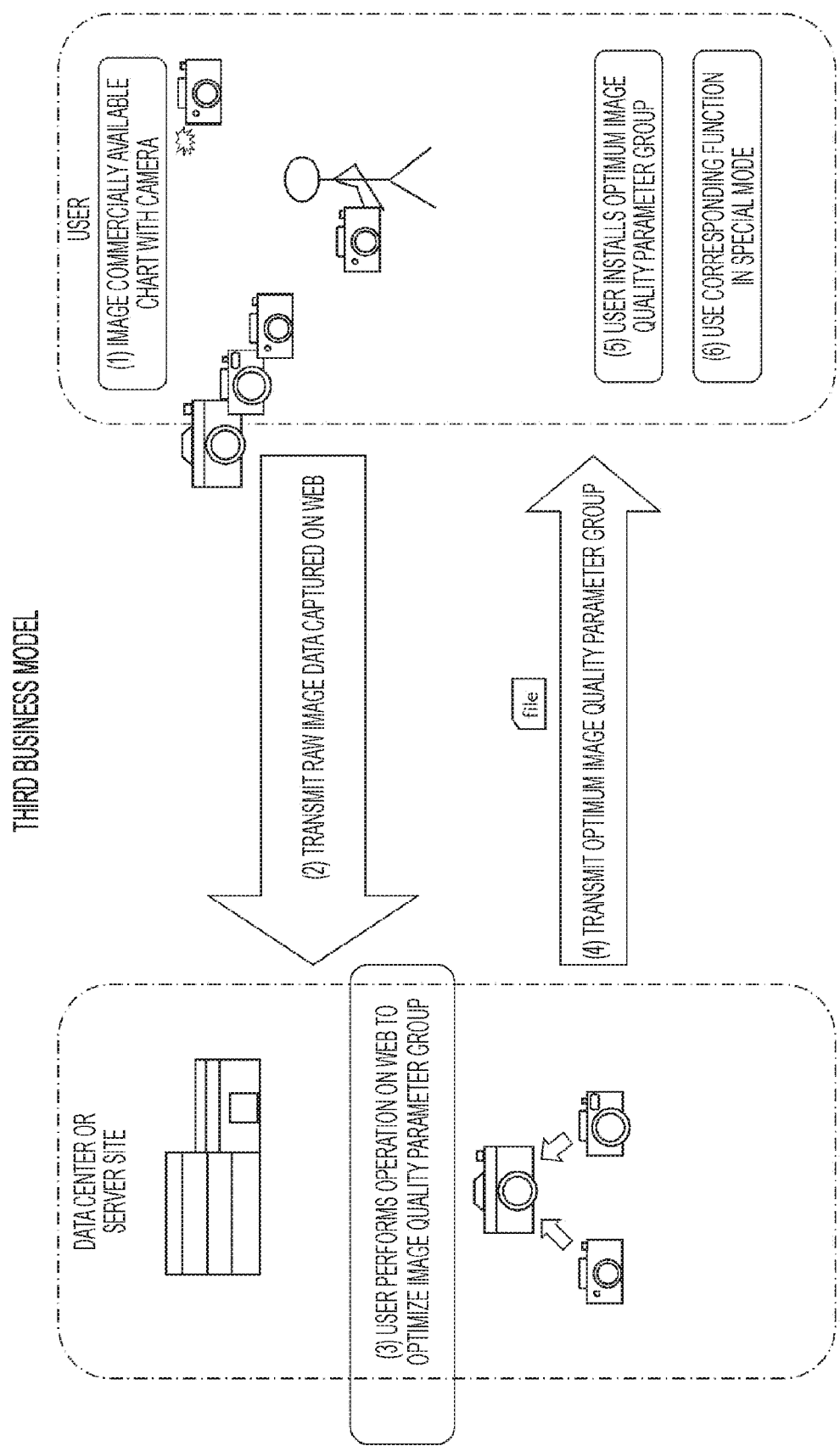
FIG. 12 is a diagram schematically illustrating a third business model using the present technology.

FIG. 12 schematically illustrates the third business model.

(1) A user images a commercially available chart (Macbeth Color Checker/ISO-12233 resolution test chart, or the like) with each camera in a camera group on which image quality adjustment is to be performed.

(2) The user transmits raw image data captured by each camera to a data center or a server site on the Web. In this case, the user does not have to, but can specify which is to be a target camera (Target) and which is to be a source camera (Src).

(3) The user performs operation on the Web to cause the image quality parameter group of each camera to be optimized on the basis of a plurality of pieces of raw image data for image quality adjustment for each camera at the data center or the server site. In this case, the user does not need to be aware of executing the optimization, and the optimization may be automatically executed by the user transmitting the raw image data of each camera to the data center or the server site.

(4) The data center or the server site transmits the optimum image quality parameter group of each camera to the user.

(5) The user installs, on each camera, the optimum image quality parameter group of each camera received from the data center or the server site as a special image quality parameter group.

(6) The user can use the special image quality parameter group by switching each camera to a special mode, and can capture images with the image qualities of the corresponding cameras being close to each other.

In this third business model, there is information regarding the individual cameras of the user, and a variation between individuals can also be optimized. Thus, the third business model can be used for both image quality adjustment between models and image quality adjustment between individual.

Note that the Web may be used to sequentially perform designation, or a dedicated application or a dedicated web application may be used for automatic execution of (2) to (5). Furthermore, the above-described chart to be used is a commercially available chart, but it is assumed that, in a case where the user is a professional, an owned or rented chart is used. Furthermore, it is also possible to download a chart on the Web, print the chart or display the chart on a screen, and image the chart as a substitute. However, this is highly dependent on a hardware environment of the user and the like, and there is a possibility that accurate results cannot be obtained.

"Fourth Business Model"

Figure 13:
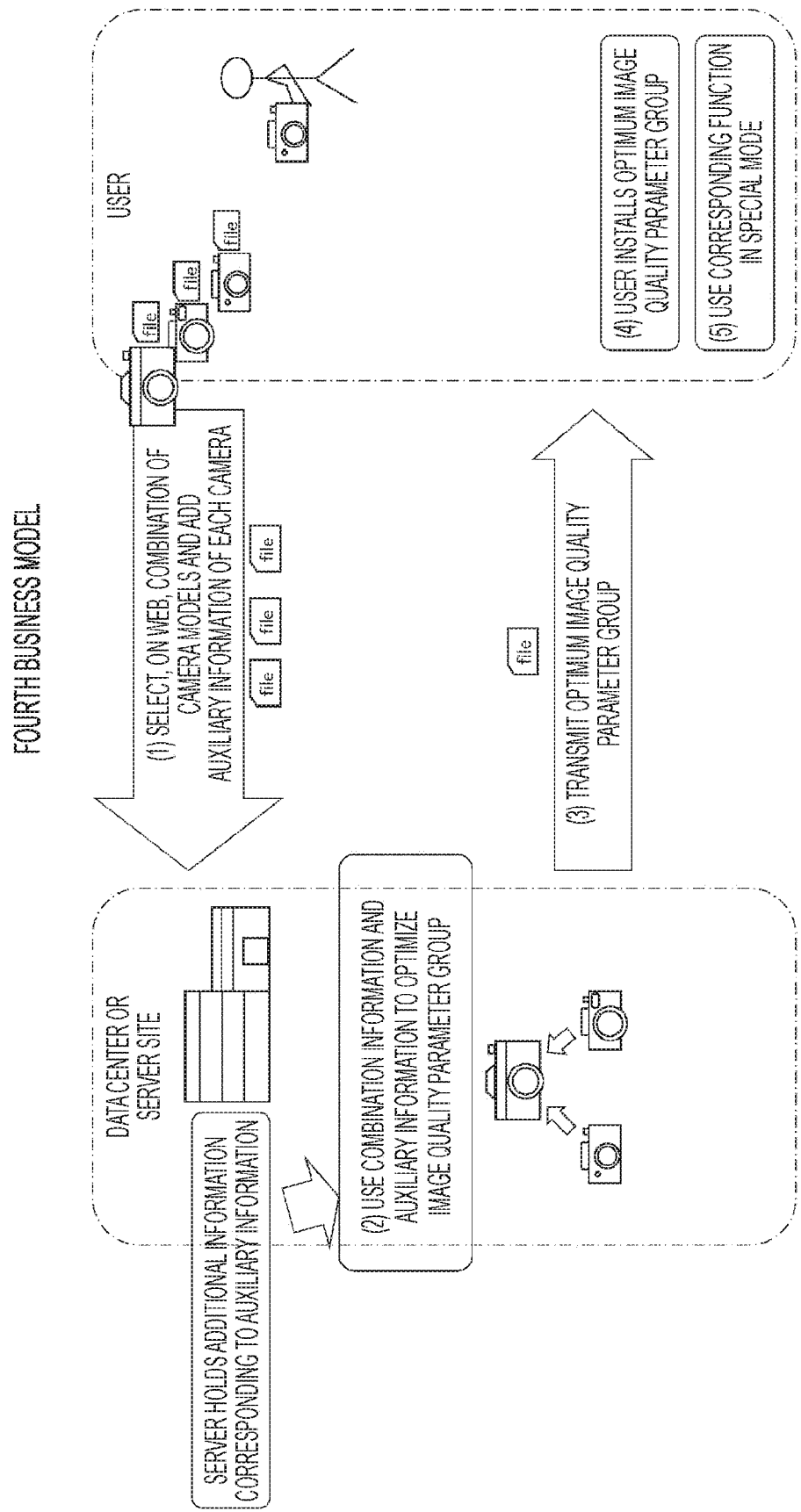
FIG. 13 is a diagram schematically illustrating a fourth business model using the present technology.

FIG. 13 schematically illustrates the fourth business model.

(1) A user selects, on the Web, a combination of models of camera groups on which image quality adjustment is to be performed, and transmits data regarding the combination to a data center or a server site. At this time, the data is transmitted together with auxiliary information held by each camera at the time of factory shipment. In this case, a combination in which a target camera (Target) and a source camera (Src) are specified may be used.

The auxiliary information includes an individual number and information regarding a variation between individuals. The auxiliary information includes an individual number as well as information regarding a variation in image quality and the like. For example, a direction and amount of shift such as how color reproducibility has shifted compared to a model average, and a magnitude of a noise amount compared to a model average may be included.

It is difficult to correct all variations between individuals at the time of shipment due to cost. It is therefore assumed that cameras are provided with, at the time of shipment, auxiliary information including sufficient information to be used as an additional service afterward. Note that it is also conceivable that the data center or the server site holds additional information corresponding to auxiliary information transmitted by a user and forms information regarding a variation between individuals by associating the additional information with the individual number. There is also a method in which raw image data obtained by imaging a chart at the time of factory shipment is kept as additional information in the data center or the server site.

(2) The data center or the server site uses information regarding the combination of models and the auxiliary information (including the information regarding the variation between individuals) to optimize an image quality parameter group of each camera. At this time, the auxiliary information is used, and this allows the variation between individuals to be corrected at the same time. At this time, it is also possible to additionally use information held by the data center or the server site in association with the individual number. Note that this optimization at the data center or the server site may be executed by the user performing operation on the Web, or may be automatically executed by the user transmitting the information regarding the combination of models and the auxiliary information to the data center or the server site.

(3) The data center or the server site transmits the optimum image quality parameter group of each camera to the user.

(4) The user installs, on each camera, the optimum image quality parameter group of each camera received from the data center or the server site as a special image quality parameter group.

(5) The user can use the special image quality parameter group by switching each camera to a special mode, and can capture images with the image qualities of the corresponding cameras being close to each other.

In this fourth business model, in addition to the information regarding the combination of models, the auxiliary information including the information regarding the variation between individuals is transmitted to the data center or the server site, and the variation between individuals can also be optimized. Thus, the fourth business model can be used for both image quality adjustment between models and image quality adjustment between individual.

4. Modified Example

Note that, in the first and second embodiments described above, the processing by the image quality evaluation systems 102 and 202, the image quality difference index calculators 103 and 203, and the image quality parameter automatic tuning systems 104 and 204 can be executed by hardware, or by software. In a case where the series of processing is executed by software, a program constituting the software is installed on a computer. Here, the computer includes a computer incorporated in dedicated hardware, a general-purpose personal computer capable of executing various functions with various programs installed therein, or the like.

Figure 14:
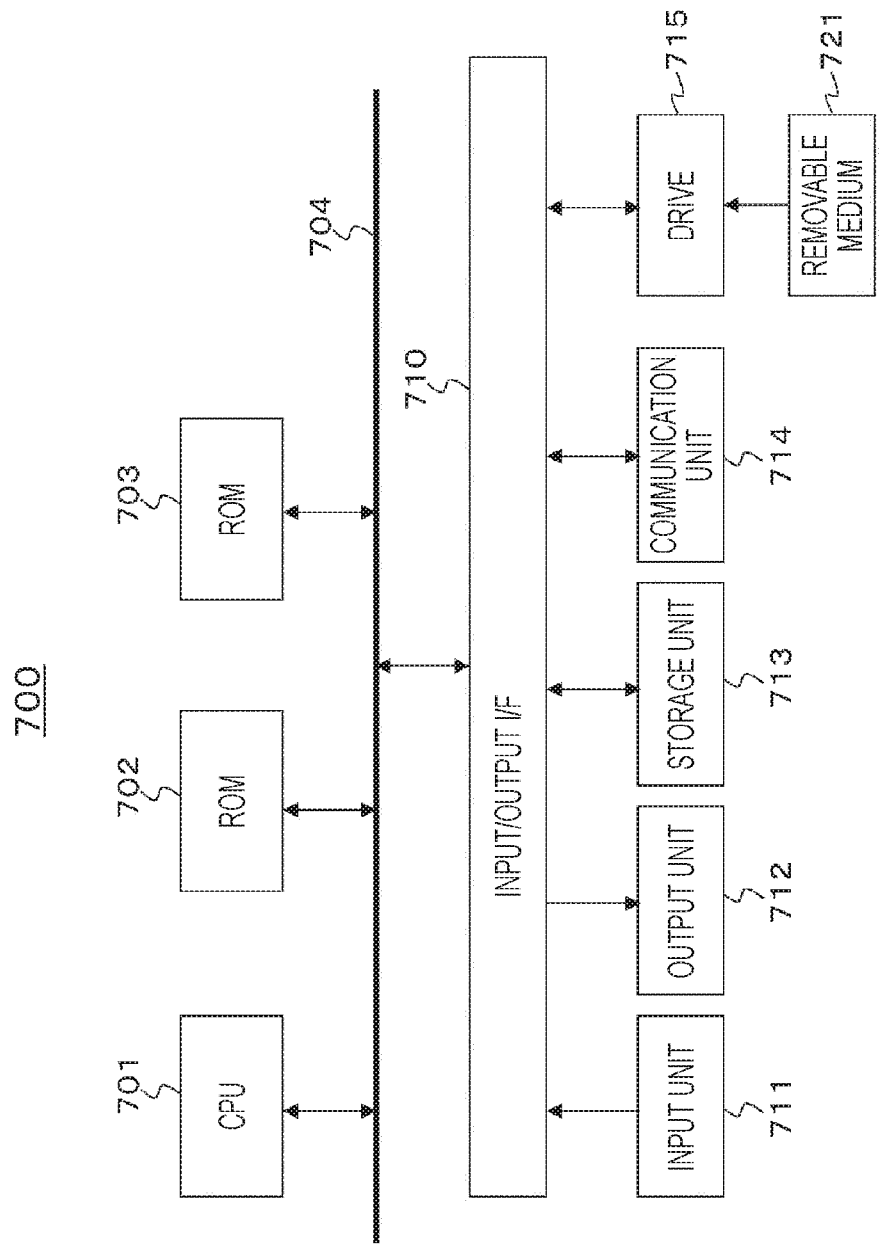
FIG. 14 is a block diagram illustrating a configuration example of a personal computer.

In FIG. 14, a central processing unit (CPU) 701 of a personal computer 700 executes various types of processing according to a program stored in a read only memory (ROM) 702 or a program loaded from a storage unit 713 into a random access memory (RAM) 703. The RAM 703 also stores, as appropriate, data or the like necessary for the CPU 701 to execute the various types of processing.

The CPU 701, the ROM 702, and the RAM 703 are connected to each other via a bus 704. An input/output interface 710 is also connected to the bus 704.

The input/output interface 710 is connected with an input unit 711 including a keyboard and a mouse, an output unit 712 including a speaker and a display including a cathode ray tube (CRT) and a liquid crystal display (LCD), the storage unit 713 constituted by a hard disk and the like, and a communication unit 714 constituted by a modem and the like. The communication unit 714 performs communication processing via a network including the Internet.

The input/output interface 710 is also connected with a drive 715 as needed, where a removable medium 721 such as a magnetic disk, an optical disk, a magneto-optical disk, or a semiconductor memory is mounted as appropriate, and a computer program read from them is installed on the storage unit 713 as needed.

Furthermore, the preferred embodiments of the present disclosure have been described in detail with reference to the accompanying drawings, but the technical scope of the present disclosure is not limited to such an example. It is obvious that a person having ordinary knowledge in the technical field of the present disclosure can come up with various changes and modifications within the scope of the technical idea described in the claims, and such various changes and modifications are naturally understood to belong to the technical scope of the present disclosure.

Furthermore, the present technology may also have the following configurations.

(1) An arithmetic device including:
an image quality evaluation value acquisition unit that obtains a first image quality evaluation value on the basis of developed image data obtained by performing development processing on captured image data; and
an image quality parameter group acquisition unit that obtains an image quality parameter group in the development processing to decrease a difference between the first image quality evaluation value and a second image quality evaluation value serving as a reference.

(2) The arithmetic device according to (1), in which
the second image quality evaluation value is obtained on the basis of developed image data obtained by performing development processing on captured image data of a second camera of the same model as or a different model from a first camera for obtaining the captured image data.

(3) The arithmetic device according to (1) or (2), in which
the image quality evaluation value acquisition unit repeatedly obtains the developed image data by performing development processing on the basis of the image quality parameter group repeatedly obtained by the image quality parameter group acquisition unit.

(4) The arithmetic device according to any one of (1) to (3), in which
the image quality parameter group is parameters that affect an image quality of the developed image data.

(5) The arithmetic device according to any one of (1) to (4), in which
the first image quality evaluation value is an evaluation value for evaluating color reproducibility, resolution, and noise feeling of the developed image data.

(6) An arithmetic method including the steps of:
obtaining a first image quality evaluation value on the basis of developed image data obtained by performing development processing on captured image data; and
obtaining an image quality parameter group in the development processing to decrease a difference between the first image quality evaluation value and a second image quality evaluation value serving as a reference.

(7) A program that causes a computer to function as:
image quality evaluation value acquisition means that obtains a first image quality evaluation value on the basis of developed image data obtained by performing development processing on captured image data; and
image quality parameter group acquisition means that obtains an image quality parameter group in the development processing to decrease a difference between the first image quality evaluation value and a second image quality evaluation value serving as a reference.

(8) An arithmetic device including:
an image quality evaluation value acquisition unit that obtains a plurality of first image quality evaluation values on the basis of a plurality of pieces of developed image data obtained by performing development processing on every one of a plurality of pieces of captured image data; and
an image quality parameter group acquisition unit that obtains an image quality parameter group in the development processing to decrease a difference between every one of the plurality of first image quality evaluation values and a second image quality evaluation value obtained on the basis of the plurality of first image quality evaluation values.

(9) The arithmetic device according to (8), in which
the image quality parameter group acquisition unit obtains the image quality parameter group under a constraint condition that ensures a certain image quality.

(10) The arithmetic device according to (8) or (9), in which
the plurality of pieces of captured image data is captured image data of a plurality of cameras, all of which are the same model, or all or some of which are different models.

(11) An arithmetic method including the steps of:
obtaining a plurality of first image quality evaluation values on the basis of a plurality of pieces of developed image data obtained by performing development processing on every one of a plurality of pieces of captured image data; and
obtaining an image quality parameter group in the development processing on the plurality of pieces of captured image data to decrease a difference between every one of the plurality of first image quality evaluation values and a second image quality evaluation value obtained on the basis of the plurality of first image quality evaluation values.

(12) A program that causes a computer to function as:

image quality evaluation value acquisition means that obtains a first image quality evaluation value on the basis of developed image data obtained by performing development processing on captured image data; and image quality parameter group acquisition means that obtains an image quality parameter group in the development processing to decrease a difference between every one of the plurality of first image quality evaluation values and a second image quality evaluation value obtained on the basis of the plurality of first image quality evaluation values.

REFERENCE SIGNS LIST 100, 200 Camera image quality adjustment system
101, 201-1, 201-2, 201-3 Camera
102, 202 Image quality evaluation system
103, 023 Image quality difference index calculator
104, 204 Image quality parameter automatic tuning system
111 Image input unit
112 Image holding unit (memory)
113 Development processing unit
114 Imaging parameter holding unit (memory)
115 Image information recording unit
116 External input/output control unit
117 User operation unit

The invention claimed is:

1. An arithmetic device, comprising:
a Central Processing Unit (CPU) configured to:
obtain image data based on a first development process on captured image data;
obtain a first image quality evaluation value group based on the obtained image data;
calculate an image quality difference index based on:
the first image quality evaluation value group, wherein the first image quality evaluation value group is associated with a first camera,
a second image quality evaluation value group, wherein
the second image quality evaluation value group is associated with a second camera, and
each of the first image quality evaluation value group and the second image quality evaluation value group includes a plurality of elements,
a number of elements in the plurality of elements, and
an image quality evaluation index weight coefficient, wherein the image quality evaluation index weight coefficient indicates a weight of each element of the plurality of elements of the first image quality evaluation value group; and
obtain, based on the calculated image quality difference index and a specific image quality parameter group, an image quality parameter group,
wherein the specific image quality parameter group and the image quality parameter group are associated with the first camera.

2. The arithmetic device according to claim 1, wherein the second image quality evaluation value group is obtained based on developed image data,
the developed image data is obtained based on a second development process on captured specific image data of the second camera, and
a model of the second camera is one of same as a model of the first camera or different from the model of the first camera.

3. The arithmetic device according to claim 1, wherein the CPU is further configured to:
repeatedly obtain the image quality parameter group; and
repeatedly obtain the image data based on a second development process on the repeatedly obtained image quality parameter group.

4. The arithmetic device according to claim 1, wherein the image quality parameter group includes a plurality of parameters that affect an image quality of the image data.

5. The arithmetic device according to claim 1, wherein each of the plurality of elements of the first image quality evaluation value group includes an evaluation value for evaluation of at least one of a color reproducibility, a resolution, or a noise feeling of the image data.

6. An arithmetic method, comprising:
obtaining image data based on a development process on captured image data;
obtaining a first image quality evaluation value group based on the obtained image data;
calculating an image quality difference index based on:
the first image quality evaluation value group, wherein the first image quality evaluation value group is associated with a first camera,
a second image quality evaluation value group, wherein the second image quality evaluation value group is associated with a second camera, and
each of the first image quality evaluation value group and the second image quality evaluation value group includes a plurality of elements,
a number of elements in the plurality of elements, and
an image quality evaluation index weight coefficient, wherein the image quality evaluation index weight coefficient indicates a weight of each element of the plurality of elements of the first image quality evaluation value group; and
obtaining, based on the calculated image quality difference index and a specific image quality parameter group, an image quality parameter group,
wherein the specific image quality parameter group and the image quality parameter group are associated with the first camera.

7. A non-transitory computer-readable medium having stored thereon, computer-executable instructions, which when executed by an arithmetic device, cause the arithmetic device to execute operations, the operations comprising:
obtaining image data based on a development process on captured image data;
obtaining a first image quality evaluation value group based on the obtained image;
calculating an image quality difference index based on:
the first image quality evaluation value group, wherein the first image quality evaluation value group is associated with a first camera,
a second image quality evaluation value group, wherein the second image quality evaluation value group is associated with a second camera, and
each of the first image quality evaluation value group and the second image quality evaluation value group includes a plurality of elements,
a number of elements in the plurality of elements, and
an image quality evaluation index weight coefficient, wherein the image quality evaluation index weight coefficient indicates a weight of each element of the plurality of elements of the first image quality evaluation value group; and obtaining, based on the calculated image quality difference index and a specific image quality parameter group, an image quality parameter group, wherein the specific image quality parameter group and the image quality parameter group are associated with the first camera.

8. An arithmetic device, comprising:

a Central Processing Unit (CPU) configured to:

obtain a plurality of pieces of image data based on a development process on each of a plurality of pieces of captured image data;

obtain a plurality of first image quality evaluation value groups based on the plurality of pieces of image data;

calculate, for each image quality evaluation value group of the plurality of first image quality evaluation value groups, an image quality difference index based on:

the plurality of first image quality evaluation value groups, wherein the plurality of first image quality evaluation value groups is associated with a plurality of first cameras, a second image quality evaluation value group, wherein the second image quality evaluation value group is associated with a second camera, and each of the plurality of first image quality evaluation value groups and the second image quality evaluation value group includes a plurality of elements, a number of elements in the plurality of elements, a number of cameras in the plurality of first cameras, and an image quality evaluation index weight coefficient, wherein the image quality evaluation index weight coefficient indicates a weight of each element of the plurality of elements of each group of the plurality of first image quality evaluation value groups; and obtain, based on the calculated image quality difference index and a specific image quality parameter group, an image quality parameter group, wherein the specific image quality parameter group and the image quality parameter group are associated with the plurality of first cameras.

9. The arithmetic device according to claim 8, wherein the CPU is further configured to obtain the image quality parameter group under a constraint condition that ensures a specific image quality.

10. The arithmetic device according to claim 8, wherein the plurality of pieces of captured image data is captured image data of the plurality of first cameras, and a model of each of the plurality of first cameras is one of same or different.

11. An arithmetic method, comprising:

obtaining a plurality of pieces of image data based on a development process on each of a plurality of pieces of captured image data;

obtaining a plurality of first image quality evaluation value groups based on the plurality of pieces of image data;

calculating, for each image quality evaluation value group of the plurality of first image quality evaluation value groups, an image quality difference index based on:

the plurality of first image quality evaluation value groups, wherein the plurality of first image quality evaluation value groups is associated with a plurality of first cameras, a second image quality evaluation value group, wherein the second image quality evaluation value group is associated with a second camera, each of the plurality of first image quality evaluation value groups and the second image quality evaluation value group includes a plurality of elements, a number of elements in the plurality of elements, a number of cameras in the plurality of first cameras, and an image quality evaluation index weight coefficient, wherein the image quality evaluation index weight coefficient indicates a weight of each element of the plurality of elements of each group of the plurality of first image quality evaluation value groups; and obtaining, based on the calculated image quality difference index and a specific image quality parameter group, an image quality parameter group, wherein the specific image quality parameter group and the image quality parameter group are associated with the plurality of first cameras.

12. A non-transitory computer-readable medium having stored thereon, computer-executable instructions, which when executed by an arithmetic device, cause the arithmetic device to execute operations, the operations comprising:

obtaining a plurality of pieces of image data based on a development process on each of a plurality of pieces of captured image data;

obtaining a plurality of first image quality evaluation value groups based on the plurality of pieces of image data;

calculating, for each image quality evaluation value group of the plurality of first image quality evaluation value groups, an image quality difference index based on:

the plurality of first image quality evaluation value groups, wherein the plurality of first image quality evaluation value groups is associated with a plurality of first cameras, a second image quality evaluation value group, wherein the second image quality evaluation value group is associated with a second camera, and each of the plurality of first image quality evaluation value groups and the second image quality evaluation value group includes a plurality of elements, a number of elements in the plurality of elements, a number of cameras in the plurality of first cameras, and an image quality evaluation index weight coefficient, wherein the image quality evaluation index weight coefficient indicates a weight of each element of the plurality of elements of each group of the plurality of first image quality evaluation value groups; and obtaining, based on the calculated image quality difference index and a specific image quality parameter group, an image quality parameter group, wherein the specific image quality parameter group and the image quality parameter group are associated with the plurality of first cameras.

* * * * *